INVENTOR
JOHANNES ANTONIUS VAN LAMMEREN
BY E. F. Ohrdroth
ATTORNEY

April 4, 1950 J. A. VAN LAMMEREN 2,502,541
SPRING OPERATED FLASHLAMP SYNCHRONIZER HAVING
AUTOMATIC RESETTING MEANS
Filed July 3, 1946 2 Sheets-Sheet 2
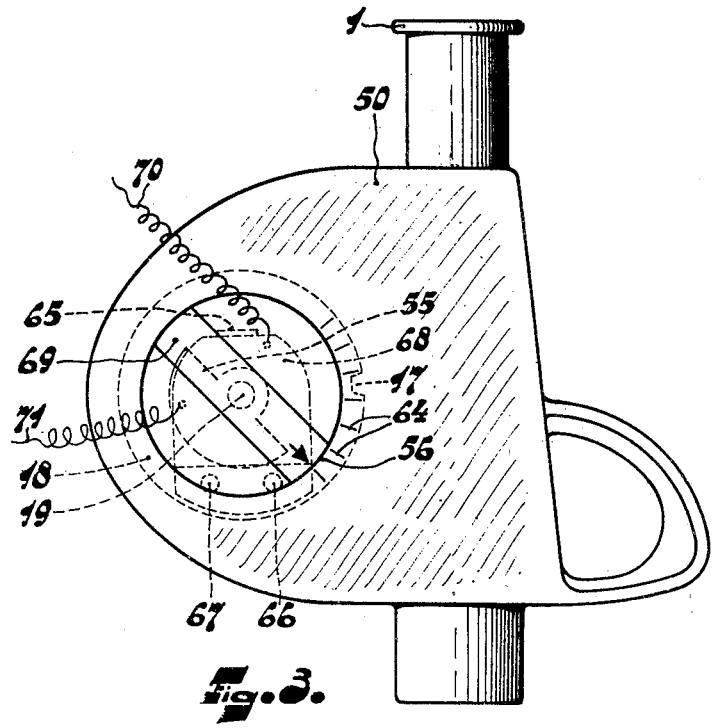
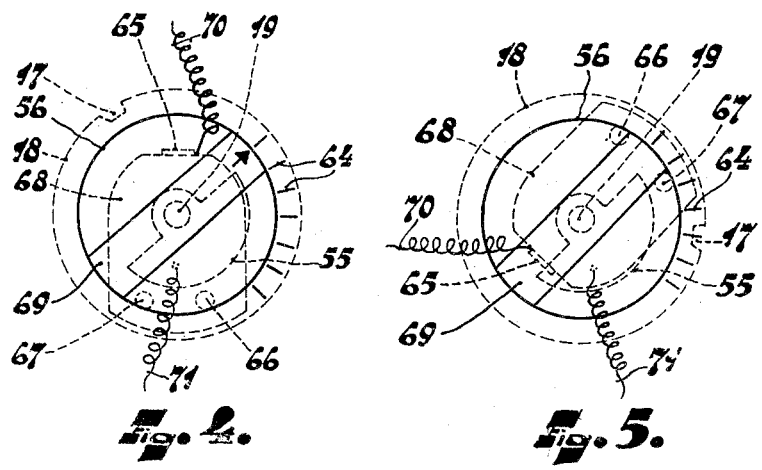
INVENTOR
JOHANNES ANTONIUS VAN LAMMEREN
BY
ATTORNEY Patented Apr. 4, 1950

2,502,541

UNITED STATES PATENT OFFICE 2,502,541

SPRING OPERATED FLASHLAMP SYNCHRONIZER HAVING AUTOMATIC RESETTING MEANS

Johannes Antonius van Lammeren, Eindhoven, Netherlands, assignor to Hartford National Bank and Trust Company, Hartford, Conn., as trustee Application July 3, 1946, Serial No. 681,382
In the Netherlands October 6, 1943

Section 1, Public Law 690, August 8, 1946
Patent expires October 6, 1963

5 Claims. (Cl. 95—11.5)

When taking photographs with a camera by the light radiated by a flash-light lamp, there arises the problem that the flash-light lamp must be ignited at a moment chosen very carefully in accordance with the moment when the shutter of the camera is opened, since flash-light lamps, according to the type of the lamp, have a shorter or longer time of starting, i. e. that the time interval which elapses between the moment when the lamp is ignited and the moment when such a lamp radiates its maximum light intensity has a shorter or longer value. The lamp never radiates its maximum light intensity at the moment of ignition. Consequently, the shutter of the camera by means of which a photograph must be taken by the light of a flash-light lamp must always be operated after the moment of ignition of the lamp, in order to have the maximum efficiency of the light of the lamp. The manufacturers of flash-light lamps furnish data about this starting time with the lamps, so that the user only has to take care that in taking a photograph the time interval between the ignition of the lamp and the opening of the shutter of his camera is chosen correctly in accordance with these data. Since with these time intervals very small values are concerned, it is practically not feasible, at least if one wishes to be sure to have the maximum efficiency of the flash-light lamp, to obtain the optimum moment of opening of the shutter after the ignition of the lamp without the use of any further expedients. In practice one invariably utilizes a so-called synchronizer, that is a device comprising an electric contact mechanism for igniting a flashlight lamp and comprising another mechanism which is controlled by the said contact mechanism and which serves to operate the shutter of the camera so as to open the shutter at a variable moment after the ignition of the flash-light lamp, the contact mechanism and the operating mechanism for the shutter being operated by the same operating knob.

A known device of this kind is constructed in such manner that on pushing an operating knob the igniting mechanism for the flash-light lamp is operated and the shutter is opened at a variable moment thereafter, but after a photograph has been taken the shutter mechanism and the contact mechanism must be brought back into their initial positions by a particular movement of the hand. It is evident that the working with such a device is thus comparatively complicated and takes up much time, which means an important drawback since synchronizers are frequently utilized for reporting purposes, and for press-photographers and persons working in related fields it is of utmost importance to be able to take several photographs as quickly as possible in succession. The known synchronizer construction has the additional drawback that, after having taken a photograph, one forgets to reset the synchronizer, so that the mechanism will not work smoothly and the results will be unsatisfactory.

The present invention obviates this drawback. The device of the above-mentioned kind according to the invention has the feature that the operating knob cooperates with a spring so as to accumulate energy in the latter when operating the knob, which energy, after the shutter has been opened and the flash-light lamp is ignited, is utilised to bring the operating knob, the operating mechanism for the shutter and the electric contact device back into their initial positions.

As compared with known synchronizers, the device according to the invention thus offers the advantage of being immediately ready to be used again after the operating knob has been released and without any further manipulations being required.

In an advantageous form of construction of the device according to the invention its contact mechanism for the flash-light lamp comprises a rotary operating member having secured to it a spring which can release as a result of pushing of the operating knob, thus causing rotation of the operating member, while during the return of the operating knob after the flash-light lamp has been ignited and the shutter has been opened the spring of the contact mechanism is put again under tension, through the intermediary of a lever system, by means of the spring of the operating knob which then releases.

The mechanism bringing back the operating mechanism for the shutter into its initial position after the shutter has been opened, may be realized in a further embodiment of the invention in such manner that between a stop provided at the operating knob and a stop provided at the operating mechanism for the shutter there is interposed an additional spring which is compressed on pushing the operating knob and which, after the operating member for the contact mechanism has been moved through a certain distance, is released by a pawl operated thereby and can open the shutter, while during the return of the operating knob to its position of rest the operating member for the shutter is brought back by a stop provided at the side of the operating knob as hereinafter described.

In order that the invention may be more clearly understood and readily carried into effect, it will be described more fully by reference to the accompanying drawings.

Figure 3 is a view of the other side of the device shown in Figure 1, the adjusting member for the synchronizer being in the position which is used when the synchronizer has to ignite a flash-light lamp having a long starting time.

Figure 4 shows diagrammatically the position of the adjusting member for the synchronizer, if the synchronizer has to ignite a lamp having a short starting time, and Figure 5 shows the synchronizer of Figure 4 at the moment when the circuit for the flash-light lamp is closed.

Figures 1, 2:
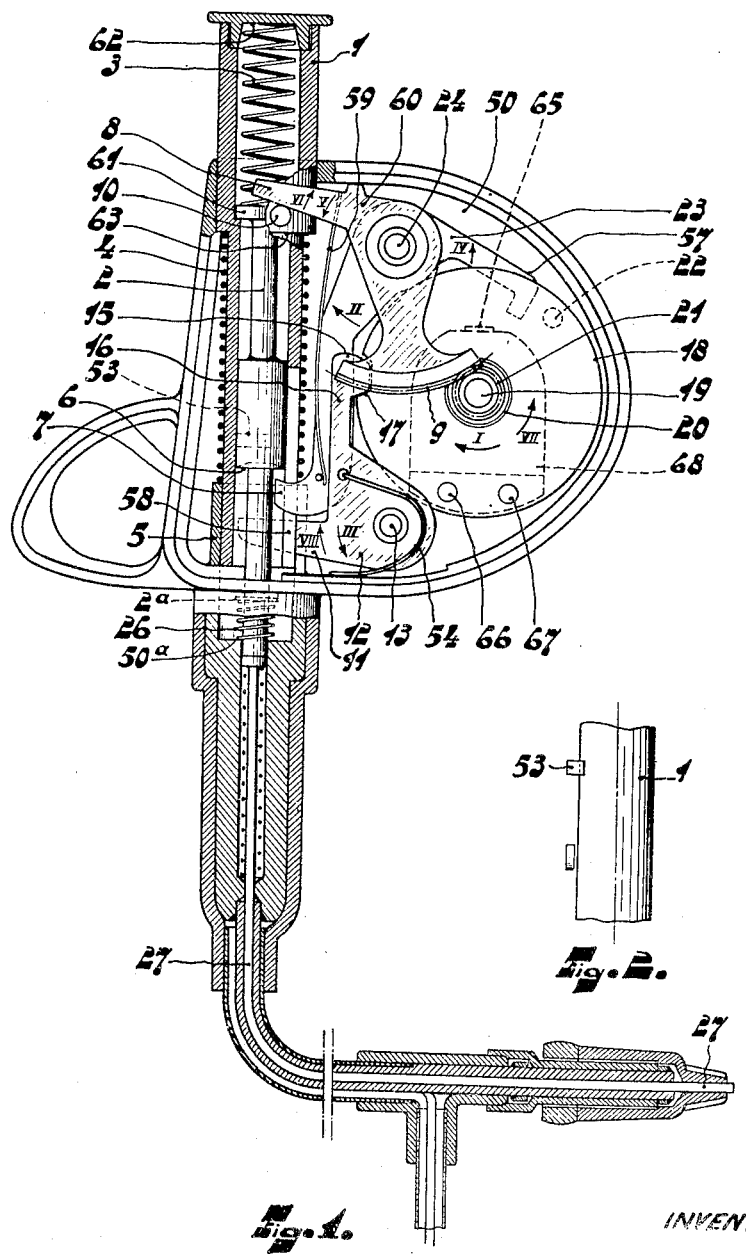
Fig. 1 shows a form of construction of a device according to the invention, with one of the walls removed so that the interior parts are visible.
Fig. 2 shows a detail of a stop provided at this device.

Inside the housing 50 of the synchronizer shown there are arranged three shafts, viz. the shafts 13, 19 and 24. About the shaft 13 a bell-crank lever 12 is rotatably mounted having an arm 11 which extends to the left and lies in the path of a stop 53 provided on the outside of an operating knob 1 (see also Figure 2). The operating knob 1 is slidably supported in the housing 50 of the synchronizer. The bell-crank lever 12 further carries an arm 16 which terminates in a cam 15 which engages in a correspondingly shaped recess 17 provided in a disc-shaped member 18. The latter is rotatably mounted on the shaft 19 already referred to. Under the action of a spring 54 the bell-crank-lever 12 is held in its position of rest in such a manner that the cam 15 lies in the recess 17.

As already mentioned, the disc-shaped member 18 is rotatably mounted on the shaft 19 and is further rigidly coupled to a pinion 21. The shaft 19 is surrounded by a spring 20 which is secured to the disc 18 so as to tend to rotate the said disc in the direction of the arrow I. In the position of rest this movement is prevented, however, due to the cam 15 and the recess 17 engaging each other. A contact member 68 provided with a protruding contact tag 65 is secured to the back of the disc 18 by means of two rivets 66 and 67, said contact member upon rotation of this disc being capable of closing an electric contact in cooperation with a sector-shaped contact member 55 secured to the inside of a cover 56 of insulating material which is rotatably arranged in the housing 50 and serves as an adjusting member (see Figure 3).

The disc 18 further comprises a stop 22 having the form of a pin protruding from the disc 18 and designed to cooperate with the cam-stop portion 57 provided at one end of a bell-crank lever 23 which is rotatable about the shaft 24. At its other extremity the bell-crank lever 23 carries a cam 7 which engages in the interior of knob 1 by means of a recess 58 extending in the longitudinal direction of this knob. In the position of rest the bell-crank lever 23 is pulled in the direction of the arrow II by means of a spring 59. Consequently, in the position of rest of this lever the cam 7 lies in the path of the operating member 2 for the shutter, which is telescopically movable in the operating knob 1, the collar 6 provided at the member 2 serving as a stop against the cam 7.

The shaft 24 has further rotatably mounted on it a bell-crank lever 60 formed at one end as a rim of gear wheel 9 which meshes with the pinion 21, its outer arm 8 cooperating with a stop 10 provided on the outside of the operating knob 1.

As previously mentioned, the operating member 2 for the shutter is telescopically movable in the operating knob 1. Between the extremity 61 of the member 2, which serves as a stop, and the inside 62 of the operating knob 1 lies a compression spring 3. Furthermore, on the outside of the operating knob 1 there is provided a compression spring 4 whose lower end bears against the fixed protrusion 5, serving as a stop, of the housing of the synchronizer and whose upper end engages with the collar 63 provided on the operating knob 1. The lower end of the member 2 is secured to the rear end of a Bowden cable 27 which serves as the operating cable for the shutter. The lower end of the member 2 is provided with a collar 2a. Between this collar and a collar 50a of the housing 50 lies a compression spring 26 which serves as a cushion when the member 2 is moved downwards.

The operation of the device shown in the figures is as follows:

When in taking a photograph with the aid of a flash-light lamp the moment of opening of the shutter of this camera is desired to be, for example, 30 milliseconds later than the moment of ignition of the flash-light lamp, in order thus to have the maximum efficiency of the light radiated by the flash-light lamp, this moment is adjusted on the division of scale 64 by means of a handle 69 provided on the cover 56 which is rotatable in the housing 50 and serves as an adjusting member. The contact strip 55 on the cover 56 serving as the adjusting member thus acquires a definite position with respect to the contact member 65 on the disc 18. Subsequently, the operating knob 1 is pushed, whereby both the spring 3 and the spring 4 are compressed. Since during this manipulation the collar 6 immediately abuts against the cam 7, the operating knob 1 will in the first instance be capable of being pushed farther than the member 2, during which operation the springs 3 and 4 are compressed and the stop 10 disengages from the arm 8 of the lever 60.

While the Bowden cable 27 still occupies its position of rest and hence the camera shutter is still closed, the stop 53 on the side of the knob 1 engages at a definite moment with the arm 11 of the lever 12, pushing it in the direction of the arrow III against the action of the spring 54. Consequently, the cam 15 disengages from the recess 17 of the disc 18, and this disc can begin to rotate in the direction of the arrow I under the action of the spring 20 which is under tension. The contact member 65 then makes electric contact with the contact strip 55 at the moment pre-adjusted with the aid of the rotary cover 56, whereupon the flash-light lamp, which is supplied, for example, by a dry-battery is ignited, since the contacts 65 and 55 are connected to the electric conductors 70 and 71, for example, via sliding contacts. Said conductors constitute one conductor of the electric circuit under consideration, the other being constituted by the housing of the synchronizer, which thus serves as a ground.

Upon rotation of the disc 18 the stop 22, after having been turned through nearly 360°, engages with the cam-stop portion 57 of the bell-crank lever 23, due to which the latter is turned in the direction of the arrow IV against the action of the spring 59. This results in that the cam 7 in front of the collar 6 of the member 2 is pulled away from the member 2 and the spring 59 is flexed and the Bowden cable 27, somewhat braked by the cushioning spring 26 is pushed to the exterior. At this moment the shutter of the camera is opened (and closed again). The photograph is now taken. During the rotation of the pinion 21 the rim of gear wheel 9 has followed the movement of this pinion and the bell-crank lever 60 has moved in the direction of the arrow V. Consequently, the arm 8 of the knee-lever 60 has followed the movement of the stop 10, though somewhat retarded.

When now, since the photograph is taken, the operating knob 1 is released the springs 3 and 4 are enabled to release again, which results in the operating knob 1 and the member 2 moving upwards. During this movement of the operating knob 1 the movement of the stop 10 is followed by the arm of the bell-crank lever 60 in the direction of the arrow VI, due to which the rim of gear wheel 9, the pinion 21 and hence also the disc 18 move in the direction of the arrow VII. During this movement the spring 20 is put under tension again. At the moment when the operating knob 1 moves upwards the pressure exerted on the arm 11 of the bell-crank lever 12 releases, due to which under the action of the spring 54 this bell-crank lever moves in the direction of the arrow VIII. The lower end of the cam 15 runs on the outer surface of the disc 18 until the cam 15 snaps into the recess 17. During the same period of time the cam-stop portion 57 of the bell-crank-lever 23 has disengaged from the stop 22 on the disc 18, due to which under the action of the spring 59 the bell-crank-lever 23 is moving again in the direction of the arrow II and the cam 7, due to the recess 58 in the operating member 1, engages again behind the collar 6 when the latter has arrived in its position of rest.

For a good understanding of the operation of the synchronizer it is mentioned that the time interval which elapses between the actuation of the bell-crank lever 12 to release the disc member 18 from the holding action of cam 15 and the moment when the shutter of the camera is opened invariably has the same value, i. e. is constant regardless of mechanical adjustments of the synchronizer. In order to render the synchronizer fit for lamps having a short or long starting time, means must be taken in such a synchronizer which determine the moment of ignition of the flash-light lamp at an adjustable moment before the moment of opening of the shutter determined by the pushing of the operating member. These means are shown in detail in Figures 3, 4, and 5.

As previously mentioned, the circuit including the flash-light lamp is closed by the contact member 65 in cooperation with the contact member 55 provided on the cover 56, serving as the adjusting member, of the synchronizer housing. By turning the cover 56 by means of the handle 69 it is possible to vary the moment in which the contact member 65 contacts with the contact strip 55. In this connection it is mentioned that the contact member 65 which, as previously observed, is fastened on the disc 18 with the aid of rivets 66 and 67, occupies its position of rest in the position shown in Figures 3 and 4, whereas Figure 5 shows the position of the contact member 65 at the moment when it contacts with the contact strip 55.

Since the disc 18 always begins to rotate at the same moment after pushing the operating knob 1 and, as mentioned before, the time interval between the opening of the camera shutter and the pushing of the operating knob is invariably the same, it will be necessary for a lamp having a long starting time to see to it that the contact members 65 and 55 already contact with each other comparatively soon after the disc 18 is set into motion. Now, this is the case in the position of the adjusting member shown in Figure 3, in which the angle through which the contact member 65 turns (according to this figure to the left) before it contacts with the contact strip 55, is approximately 45°. On the other hand, the adjustment of the adjusting member 56 shown in Figure 4 is designed for a lamp having a short starting time, so that in this case the angle of rotation of the contact member 65, before making electric contact with the contact strip 55, is much larger than that in Figure 3 and in this case is approximately 135°. This angle is adjustable with the aid of the divisions of scale 64.

From Figure 5 it can be seen how the position of the contact member 65 with respect to the contact strip 55 will be at the moment when the electric contact is closed.

What I claim is:

1. In a photographic synchronizer unit having a shutter actuator for the camera, an electric contact mechanism for igniting a flashlight, timing means for synchronizing the shutter actuation with the peak radiation of the flashlight, a system of mechanically controlled latch levers, and a common operating member for the control of the shutter actuator, the contact mechanism, and said levers, in combination means for automatically resetting after each exposure, said shutter actuator, said contact mechanism and timing means, said latch-levers, and the common operating member for all said elements, said resetting means comprising spring means and tensioning means for the same, said tensioning means having a member capable of unlocking during the operating move the one of said latch-levers in control of the contact mechanism, said contact mechanism comprising a rotatable disc and spring means secured to said disc and becoming operative upon the unlocking of said latch-lever for rotating said disc over a predetermined angle, means on said disc for engaging a second one of said latch-levers and thereby turning the same so as to release the shutter actuator in predetermined time interval after the ignition of the flashlight, said tensioning means being adapted on its return move to effect the operation of said levers and their return to locked position in reverse, thereby resetting the shutter actuator and the contact mechanism, said return move of said tensioning means to starting position occurring automatically after exposure by means of the energy stored in said tensioned spring means.

2. In a photographic synchronizer unit having a shutter actuator for the camera, an electric contact mechanism for igniting the flashlight, timing means for synchronizing the shutter actuation with the peak radiation of said flashlight, and a combined operating and automatic resetting mechanism for the shutter actuator and the contact mechanism, said combined operating and resetting mechanism comprising a first spring and a member for tensioning said spring, said spring upon tensioning being adapted to operate the shutter actuator, means for normally holding said shutter actuator against actuating movement, a second spring for controlling said contact mechanism, said contact mechanism including a rotatable disc to which said second spring is secured at one end, the other end of said spring being secured to a stationary member, said second spring being loaded in normal position and tending to rotate said disc, means for holding said disc of said contact mechanism against rotation and capable of releasing the same for rotation, a tripping member on said spring tensioning means which upon operation of said means is capable of unlocking the disc-holding means, an element on said disc capable after rotation thereof to engage said holding means for the shutter actuator and of withdrawing it from holding position, and a third spring tensioned upon movement of said first spring by said tensioning member and adapted to store energy which upon cessation of the tensioning force becomes active for automatically restoring to normal positions the spring tensioning member, the shutter actuating and contact mechanisms and the holding means for both mechanisms, and for reloading the spring for rotating the disc of the contact mechanism.

3. In a photographic synchronizer unit having an actuator for the camera, an electric contact mechanism for igniting the flashlight, timing means for synchronizing the shutter actuation with the peak radiation of said flashlight, and a combined common operating and automatic resetting mechanism for the shutter actuator and the contact mechanism, said combined operating and resetting mechanism comprising a first spring and a member for tensioning said spring, said spring upon tensioning being adapted to operate the shutter actuator, means for normally holding said shutter actuator against actuating movement, a second spring for controlling said contact mechanism, said contact mechanism including a rotatable disc to which said second spring is secured at one end, the other end of said spring being secured to a stationary member, said second spring being loaded in normal position and tending to rotate said disc, means for holding said disc of said contact mechanism against rotation and capable of releasing the same for rotation, a tripping member on said spring tensioning means which upon operation of said means is capable of unlocking the disc-holding means, an element on said disc capable after rotation thereof to engage said holding means for the shutter actuator and of withdrawing it from holding position, and a third spring tensioned upon movement of said first spring by said tensioning member and adapted to store energy which upon cessation of the tensioning force becomes active for automatically restoring to normal positions the spring tensioning member, the shutter actuating and contact mechanisms and the holding means for both mechanisms and a connection interposed between said spring tensioning member and said contact mechanism which permits the spring tensioning member to overrun the contact mechanism on the operating move and is adapted to reload the spring associated with the contact mechanism on the return move of the spring tensioning member.

4. In a photographic synchronizer unit having a shutter actuator for the camera, an electric contact mechanism for igniting the flashlight, timing means for synchronizing the shutter actuation with the peak radiation of said flashlight, and a combined common operating and automatic resetting mechanism for the shutter actuator and the contact mechanism, said combined operating and resetting mechanism comprising a first spring and a member for tensioning said spring, said spring upon tensioning being adapted to operate the shutter actuator, means for holding said shutter actuator against actuating movement, a second spring for controlling said contact mechanism, said contact mechanism including a rotatable disc to which said second spring is secured at one end, the other end of said spring being secured to a stationary member, said second spring being loaded in normal position and tending to rotate said disc, means for holding said disc of said contact mechanism against rotation and capable of releasing the same for rotation, a tripping member on said spring tensioning means which upon operation of said means is capable of unlocking the disc-holding means, an element on said disc capable after rotation thereof to engage said holding means for the shutter actuator and of withdrawing it from holding position, and a third spring tensioned upon movement of said first spring by said tensioning member and adapted to store energy which upon cessation of the tensioning force becomes active for restoring to normal positions, the spring tensioning member, the shutter actuating and contact mechanisms and the holding means for both mechanisms, and a connection interposed between said spring tensioning member and said contact mechanism which permits the spring tensioning member to overrun the contact mechanism on the operating move and is adapted to reload the spring associated with the contact mechanism on the return move of the spring tensioning member, said connection comprising a stop member on said spring tensioning member and a bell crank lever arranged for cooperation between said member and said contact mechanism, said lever having one arm capable of engagement with said stop and the other arm formed as a gear segment capable of meshing with a pinion secured to the disc mounting shaft and capable of reloading said spring for disc rotation when on the return stroke of said spring tensioning means said stop engages said one arm and thereby rotates the pinion by gear engagement with said other arm.

5. In a photographic synchronizing system, apparatus for opening the shutter of a camera in timed relation with respect to the peak radiation of a flash-lamp having a shutter opening mechanism which functions on a constant time interval after being set in motion, adjustable electric contacting mechanism comprising a pair of contact members one fixed and the other movable, means for closing said contacts at a predetermined time interval depending upon their relative setting, and a combined operating and automatic resetting mechanism for the shutter actuating and electric contact mechanisms, said combined mechanism comprising a knob member telescopically enclosing a piston member, a spring placed under tension by the forward movement of said knob, said piston having a collar adapted to engage a cam arm on a first bell-crank lever for temporarily arresting the movement of said piston, a timing mechanism for synchronizing the electric contacting mechanism with the shutter opening mechanism, said timing mechanism including a stop carried by said knob and positioned to engage the arm of a second bell-crank lever thereby actuating a cam construction adapted to release a detent normally locking a rotatable disc carrying said movable contact, said disc being under the influence of a normally loaded spring, said bell-crank mechanism being actuated by said contact mechanism relative to the closing of the electric contact, and a spring tensioned upon movement of said first spring by said knob member and adapted to store energy which upon cessation of the tensioning force becomes active for automatically restoring to normal position the knob member, the piston, the piston arresting mechanism, the electric contact mechanism, the timing mechanism therefor, the holding means associated with said mechanisms and for reloading the spring influencing the disc of the timing mechanism, said spring-reloading means comprising a connection interposed between said spring tensioning member and said contact mechanism which permits the spring tensioning member to overrun the contact mechanism on the operating move and includes a lever actuated on the return move and capable of rewinding the said spring influencing the disc of the timing mechanism.

JOHANNES ANTONIUS van LAMMEREN.

REFERENCES CITED

The following references are of record in the file of this patent:

UNITED STATES PATENTS

| Number | Name | Date |
|---|---|---|
| 1,332,173 | Froelich | Feb. 24, 1920 |
| 1,996,592 | Schwarz | Apr. 2, 1935 |
| 2,117,509 | Schwarz | May 17, 1938 |
| 2,238,115 | Johnson | Apr. 15, 1941 |
| 2,298,382 | Hutchison et al. | Oct. 13, 1942 |
| 2,321,945 | Schwarz et al. | June 15, 1943 |